United States Patent [19]

Schanze

[11] 4,426,397

[45] Jan. 17, 1984

[54] PROCESS FOR THE PRODUCTION OF A CONCENTRATE CONTAINING A BEE PRODUCT, A CONCENTRATE CONTAINING A BEE PRODUCT AND ITS USE

[76] Inventor: Rudolf Schanze, b. G. Herrmann-Seidel, Friedenstr. 43, D-8034 Unterpfaffenhofen, Fed. Rep. of Germany

[21] Appl. No.: 329,692

[22] Filed: Dec. 11, 1981

[30] Foreign Application Priority Data

Dec. 29, 1980 [DE]  Fed. Rep. of Germany ....... 3049380

[51] Int. Cl.³ .................... A23L 1/08; A23L 1/30; A23C 9/10
[52] U.S. Cl. ........................................ 426/62; 426/63; 426/72; 426/74; 426/588; 426/658; 426/656; 426/613; 426/800; 426/801; 426/810; 426/590
[58] Field of Search ............... 426/658, 588, 613, 590, 426/810, 800, 801, 62, 63, 72, 74, 656

[56] References Cited

U.S. PATENT DOCUMENTS

| | | | |
|---|---|---|---|
| 2,621,128 | 12/1952 | Webb et al. | 426/658 |
| 2,693,420 | 11/1954 | Straub | 426/658 |
| 2,748,003 | 5/1956 | Straub | 426/658 |
| 3,244,528 | 4/1966 | Torr | 426/658 |
| 3,351,472 | 11/1967 | Finley | 426/658 |
| 3,780,185 | 12/1973 | Fields et al. | 426/658 |
| 3,879,567 | 4/1975 | Verner | 426/658 |
| 3,906,114 | 9/1975 | Glabe et al. | 426/658 |
| 3,950,551 | 4/1976 | Glabe et al. | 426/658 |
| 4,220,666 | 9/1980 | Fields | 426/658 |

FOREIGN PATENT DOCUMENTS 376887  7/1932  United Kingdom ................. 426/34

*Primary Examiner*—Jeanette M. Hunter
*Attorney, Agent, or Firm*—Ostrolenk, Faber, Gerb & Soffen

[57] ABSTRACT

The invention relates to a process for the production of a concentrate containing a bee product. According to the invention, bee pollen, bee bread, propolis or honey or mixtures thereof are added to concentrates of whole milk, skimmed milk, protein-enriched filtrates from the membrane separation of milk, various wheys or other byproducts of the milk industry or mixtures thereof and the mixture obtained is stirred until a homogeneous dispersion is obtained, followed by concentration through evaporation and drying. Carbohydrates, yeasts, single-cell proteins or other microorganisms and additives may optionally be added to the mixture of bee product and milk product. The invention also relates to concentrates containing bee products and to the use of these concentrates as a dietetic, anabolic or strengthening aid for human beings and animals, as preparations for young children and sportsmen and women or as a feed supplement for young animals.

13 Claims, No Drawings

PROCESS FOR THE PRODUCTION OF A CONCENTRATE CONTAINING A BEE PRODUCT, A CONCENTRATE CONTAINING A BEE PRODUCT AND ITS USE

BACKGROUND OF THE INVENTION

This invention relates to a process for the production of concentrates containing bee products, to concentrates containing bee products and to their use.

The food and dietetic product market is being supplied inter alia with increasing quantities of bee products, particularly honey. Other bee products are blossom pollen, blossom pollen dissolved in honey, propolis or bee bread and mixtures of these bee products which are distinguished by very good dietetic and health-giving properties. The significance of honey and other bee products as a food, stimulant and curative is primarily attributable to their content of readily absorbed carbohydrates, enzymes, appetite-stimulating aromatic substances and not least to mineral constituents and trace elements which occur in bee products. Of particular medicinal significance is the occurrence of acetyl choline in honey—a substance which as a cholinergic factor lowers blood pressure and stimulates stomach and intestinal activity. Finally, importance is attached to the bacterial inhibitors which play a part in the favourable effect of honey on wounds.

One feature common to many of the products mentioned above is that they do not keep for very long, show a tendency to sediment in conjunction with honey, often undergo undesirable crystallisation and, in some cases, have an unpleasant taste. For example, blossom pollen or bee bread has a hay-like odour and taste which puts off may consumers.

Accordingly, successful attempts have been made to improve these properties, for example by the addition of alcohol and flavourings. Another disadvantage of bee products is their limited shelf life. On account of their high water contents, bee products—especially propolis and pollen—age rapidly and deteriorate easily.

PRIOR ART

It is also known that dietary products may be enriched with pollen, propolis and Gelee Royal (cf. FR-PS Nos. 2,244,409 and 1,121,244). For consumption, the above-mentioned bee products are often mixed with honey which prolongs their shelf life and improves their taste. However, the honey makes it virtually impossible to convert the products into a solid form so that they have to be made up as dragees, tablets or capsules. Naturally, this adds to the cost of the bee products which are already very expensive and only available in small quantities.

German Pat. No. 923,158 describes a process for the production of a non-hygroscopic dietetic nutrient and restorative in which honey is added to milk, the resulting mixture is stirred at high speed for a prolonged period and then dried by evaporation and spray-drying. The disadvantage of this known process is that the proportion of solids emanating from the honey may amount to at most 10%, based on 100% dry mass. If it is desired to produce products having a higher content of honey products, spray-drying is ruled out because coatings are formed on the walls of the spray-drying installation, for example a drying tower. If for example around 20% of honey is used, the system collapses and drying is no longer possible.

DE-OS No. 2,919,059 describes a buttermilk-honey preparation in dry form as a dietetic food. This buttermilk-honey preparation is produced by stirring dry buttermilk, i.e. buttermilk powder, and bee honey together for a prolonged period and then leaving the mixture to stand, in general for two to three days, so that it may react, after which the stored mixture may finally be size-reduced into a dry product. The disadvantage of this known process is that it can only be carried out with a dry powder and that the reaction times are very long. In the third paragraph on page 6 of the above-mentioned DE-OS, it is stated that no other milk protein powder can be used instead of buttermilk powder because otherwise products having an unpleasant taste would be obtained.

Accordingly, there has long been a need to convert the above-mentioned bee products into a form in which they may readily be stored and are convenient to handle.

OBJECT OF THE INVENTION

Accordingly, the object of the present invention is readily to convert bee products, such as bee pollen, bee bread and propolis, into a storable permanent form. The product obtained should preferably be solid and granular or pulverulent. According to the invention, the bee products are also intended to be improved in regard to their nutritional value and to be converted into products of high dietetic value.

It has surprisingly been found that, by adding bee products to milk product concentrates and stirring, drying and grinding the resulting mixture, the bee products may be converted into products of high dietetic value.

Accordingly, the present invention relates to a process for the production of a concentrate containing a bee product which is characterised in that bee pollen, propolis, honey, wax or mixtures thereof are added to concentrates of whole milk, skimmed milk, protein-enriched filtrates from the membrane separation of milks, various wheys or other by-products of the milk industry or mixtures thereof, carbohydrates are added to the mixture of bee product and milk product and the resulting mixture is stirred for 10 to 60 minutes at 15° to 75° C. until a homogeneous dispersion is obtained, followed by concentration through evaporation, drying and—optionally—size-reduction and grinding, the individual constituents being added in such quantities that the product obtained contains from 10 to 40% by weight of dry mass emanating from bee products, from 25 to 70% by weight of dry mass emanating from milk products, from 3 to 55% by weight of dry mass emanating from carbohydrates, based on the total dry mass.

The invention also relates to the concentrates containing bee products obtained by this process.

The invention also relates to a concentrate containing bee products which is characterised in that it contains from 10 to 40% by weight of dry mass emanating from bee products, from 25 to 70% by weight of dry mass emanating from milk products, from 3 to 55% by weight of dry mass emanating from carbohydrates, from 0 to 10% by weight of dry mass emanating from yeasts or other microorganisms, from 0 to 25% by weight of dry mass emanating from other additives, based on the total dry mass.

According to the invention, the product contains from 10 to 40% by weight of dry mass emanating from bee products. Of this 10 to 40% by weight, 0 to 10% of dry mass may emanate from wax. However, the wax must not be present in the bee product in excess of such amount. Beeswax is rich in vitamin A (approx. 40 th. IU/kg), but is largely indigestible to human beings. However, it has favourable effects on the digestive organs and particularly the respiratory tract. In conjunction with the mixture obtained by the process, it is suitable for use as physiological ballast and is capable of reducing the hygroscopicity of the end product so that, in addition to a good consistency, it is possible to obtain high mixture stability and high stability in storage. If necessary, it should be introduced into the mixture in quantities of from 0 to 10%, preferably in quantities of from 0 to 8% and, more preferably, in quantities of from 0 to 5%, particularly in preparations intended to maintain resistance to infections.

The invention also relates to the use of the concentrates containing bee products as a dietetic, anabolic or strengthening aid for human beings and animals, as preparations for young children and sportsmen and women or as a feed supplement for young animals.

It has surprisingly been found that, by combining the bee products with milk products, the bee products can be converted into powder-form concentrates. In addition, the product according to the invention has the advantage that the milk minerals, milk protein and the vitamins and organic acids in milk enhance the taste and the nutritional value of the bee products and honey so that a biological concentrate of high nutritional value is obtained.

According to the invention, bee pollen, propolis, bee bread or honey or mixtures thereof are used. It is preferred to use honey or a mixture of honey, bee pollen, propolis or bee bread.

In one particularly preferred embodiment, bee pollen already dissolved in honey is used.

According to the invention, the milk products are used in the form of concentrates having a dry mass content of from 25 to 50% by weight and preferably from 30 to 40% by weight, based on the total dry mass. Products such as these are obtained by concentrating whole milk, skimmed milk, protein-enriched filtrates from the membrane separation of milk, whey or other by-products of the milk industry using methods known per se. The bee products, such as blossom pollen, pollen or bee bread, which are already dissolved in honey, propolis, honey or mixtures thereof are added with stirring to the concentrates in question, which may have temperatures in the range from 15° to 25° C. The bee products may be added all at once or run in slowly over a period of for example from 10 to 35 minutes. However, this is not intended in any way to be a limitation. It would even be possible if desired initially to add one of the above-mentioned bee products and then to add more honey. The bee products dissolve in a short time and a homogeneous dispersion is obtained. Stirring is continued until this homogeneous dispersion is obtained. Surprisingly, the viscosity of the milk concentrates facilitates rapid and complete dissolution. Temperatures in the range from 15° to 75° C. are applied both during stirring and during the addition. If the above-mentioned bee products are used rather than wax, the temperatures applied are in the range from 15° to 45° C. and preferably in the range from 25° to 35° C. It is only in cases where up to 10% of beeswax is additionally used that the temperature should be briefly increased to at most 75° C. to disperse the relatively high-melting wax or, alternatively, the thinly liquid wax heated to that temperature is dispersed with vigorous stirring in the reaction mixture, in which case the overall temperature should not be increased beyond 45° C. to ensure that the enzymes are not inactivated. The time required for stirring is variable and amounts for example to between 10 minutes and 1 hour. In general, however, homogeneous dispersion is obtained after a short time, for example after 10 to 15 minutes.

Other additives, such as sugar, preservatives, dyes, flavourings, sweeteners, minerals, trace elements, emulsifiers, vitamins, particularly vitamin-B-complex, enzymes, amino acids specific protein supplements and/or the like, or mixtures thereof may optionally be added to the resulting concentrate of milk product and bee product. Sugar is preferably added to the products. Supplementing sugars, such as for example maltose, sucrose, sorbose, mannose, etc. may be used as the sugar.

According to the invention, carbohydrates other than sugar, for example cereal flours of any type, are added to the mixture of bee product and milk product so that they are saturated with the liquid and may be homogeneously dispersed by vigorous stirring. The carbohydrates may be added to a concentrate already containing the additives. However, the additives may even be added after the carbohydrates.

Examples of carbohydrates suitable for use in accordance with the invention are cereal flakes, wheatgerm and gluten products (corn gluten), α-celluloses, hemicelluloses and similar products. It is also possible to use potato starch, potato flour and cereal flour and by-products of cereals, such as by-products of rice, corn, barley, wheat, oats, rye, millet, etc.

In another embodiment of the invention, yeasts, yeast extracts, single-cell proteins and/or other microorganisms are added to the concentrate of milk product, bee product and carbohydrates. These products are added after the carbohydrates. It does not matter whether the concentrate already contains the additives. The additives may even be added to the concentrate after these products.

The addition of yeasts has the advantage that enzymes, vitamin-B-complex and specific protein supplements are added.

According to the invention, the various products mentioned above are mixed in such a way that the products obtained contain from 10 to 40% by weight and preferably from 15 to 30% by weight of dry mass emanating from bee products, incl. 0–10 % by weight of wax, from 25 to 70% by weight and preferably from 30 to 50% by weight of dry mass emanating from milk products, from 3 to 55% by weight, preferably from 10 to 40% by weight and, most preferably, from 15 to 35% by weight of dry mass emanating from carbohydrates, from 0 to 10% by weight and preferably from 2 to 8% by weight of dry mass emanating from yeasts, single-cell proteins or other microorganisms and from 0 to 25% by weight, preferably from 0 to 15% by weight and, most preferably, from 2 to 8% by weight of dry mass emanating from other additives, based on the total dry mass.

As mentioned above, the products according to the invention preferably always contain honey. The honey may be present in a quantity of from 10 to 40% by weight of dry mass emanating from the honey, based on the total dry mass. It is preferably present in a quantity of from 10 to 20% by weight of dry mass emanating from bee products. However, the bee products do not necessarily have to contain honey, i.e. they may also be free from honey.

Examples of formulations for concentrates according to the invention are given in Table I below:

and remain unaffected by, the addition of the honey and the bee products which, on their own, are virtually impossible to dry.

Final drying may be carried out by spray-drying or cylinder-drying. It is preferred to use steel cylinders with a relatively low vapour pressure to protect the ingredients and to build up thick layers of film so that flakes or granulates are obtained.

Where drying is carried out by means of cylinder dryers, it is of particular advantage in the interests of the process to use steel cylinders of the type which have only recently been developed. Instead of thick-walled cast-iron cylinders, these steel cylinders consist of thin-walled cylinders of which the surface is chromium-plated. The advantage of this is that the flow of heat

TABLE I

| Constituent | % dry mass Examples | | | Technical observations |
|---|---|---|---|---|
| | 1 Health-sustaining preparation | 2 Anti-infection preparation | 3 Anabolic preparation | |
| Milk products | | | | Initial addition as warm (25-40°) conc. |
| Whole milk or skimmed milk or mixtures thereof | 25–50 | 10–30 | 5–25 | Together min. 25 - max. 70 |
| Protein concentrate from ultra-filtration | 0–10 | 15–30 | 0–10 | |
| Mineral concentrate from sugar manufacture or electrodialysis | 0–25 | 0–10 | 0–25 | |
| Bee products | | | | Addition to the milk concentrate |
| Honey | 5–35 | 5–15 | 5–25 | Together min. 10 - max. 40 |
| Bee pollen | 5–15 | 5–15 | 5–25 | |
| Propolis extract, 10–25% | — | 0–10 | 0–10 | |
| Honeycomb wax | 0–5 | 0–10 | 0–5 | |
| Supporting products | | | | Addition to the mixture of milk + bee product |
| Brewer's yeast, single cell proteins, other microorganisms | 0–10 | 0–10 | 0–10 | |
| Carbohydrates and starch products | 20–40 | 10–40 | 5–40 | Together min. 0 - max. 65 |
| α-celluloses | 0–10 | 0–10 | 0–15 | |
| Various sugars, malt extracts | 0–10 | 0–10 | 0–15 | |
| Minerals and trace elements, vegetable ash | 0–10 | 0–15 | 0–20 | |
| other additives, e.g. Flavourings, vitamins, amino acids, sweeteners | 0–5 | 0–7 | 0–8 | |

Mixing of the milk products with the bee products gives a wet product consisting of liquid milk product and—dispersed therein—a solid bee product or—dissolved therein—a liquid bee product and dispersed carbohydrates and/or yeasts and dissolved or dispersed additives.

This creamy to viscoplastic mass, of which the dry mass contents range from 25 to 60% and preferably from 45 to 55%, may be dried in spray-drying towers in cases where particularly gentle drying is required, otherwise it is cylinder-dried. It has surprisingly been found that the milk products do not suffer as a result of, through the metal wall is considerably improved. Another advantage of steel cylinders of the type in question is that the drying temperature and vapour pressure may be reduced by approximately half. At the same time, the rate at which the film of wet material applied dries also increases so that it is possible to work at a very low temperature and at an increased rotational speed, i.e. with a drastically shortened drying time. In this way, the heatsensitive vitamins and enzymes in the bee products are protected against inactivation and loss and the end product remains almost completely unchanged in regard to its biological properties.

Cylinder drying for example gives a dry and brittle film which may contain up to 5% of residual water. The product accumulates in flake form and may be further ground.

The percentages which may be converted into dry permanent forms of bee product concentrates were worked out in a fairly extensive series of tests. They are shown in Table II.

TABLE II

| Constituents | Examples of drying by | |
| --- | --- | --- |
| | spray drying percentages by weight | cylinder drying percentages by weight |
| | in the dry mass (wet material = end. product = 100) | |
| Honey | 10–20 | 15–30 |
| Bee pollen | } 5–25 | } 10–30 |
| Bee bread | | |
| Propolis | 1–5 | 2–10 |
| Beeswax | 0–8 | 0–10 |
| Whole milk | } 25–85 | } 25–50 |
| Skimmed milk | | |
| Sugars | 5–10 | 0–20 |
| Cereal flours, starch products, carbohydrates | 5–10 | 20–40 |
| Casein, caseinates | 0–10 | 0–20 |
| Whey and other milk by-products | 0–35 | 0–35 |
| Yeasts, single-cell proteins, microorganisms | 0–10 | 5–20 |
| Degree of concentration | 30–45 | 35–60 |
| Other additives | 0–5 | 0–7 |

According to the invention, therefore, milk products, bee products and, optionally, additives, preferably sugars, carbohydrates and yeasts, may be combined and processed with one another to give a number of different products which are distinguished by high biological and dietetic values, a pleasant appearance, a very pleasant odour and taste, extremely good keeping properties and stability in storage, universal use as an end product or constituent of other products.

In addition, the products according to the invention may be economically produced in a favourable manner.

The products according to the invention are used as a dietetic, anabolic or strengthening aid for human beings and animals, as preparations for small children and sportsmen and women or as a feed supplement for young animals.

The invention is illustrated by the following Examples:

EXAMPLE 1

General Procedure

The milk product concentrate is introduced into a reactor. The bee product is added to the milk concentrate with vigorous stirring, followed by stirring for 1.5 to 2 hours.

Sugar and/or flavourings and, optionally, cereal flour are added to the mixture obtained.

The mixture obtained is then spray-dried or cylinder-dried to a residual moisture content of from 0.5 to 5%.

EXAMPLE 2

The procedure is as in Example 1.

| Example | | Quantity (kg) | kg-dry mass |
| --- | --- | --- | --- |
| 1 | Initial addition skimmed milk dry mass content (=DM) 35% | 110 | 38.5 |
| 2 | Bee product consisting of 1 part by weight of pollen and 1 part by weight of bee honey, 80% DM | 50 | 40 |
| 3 | Grape sugar, beet sugar cane sugar | 15 | 15 |
| 4 | Flavourings | 0.01 | 0.01 |
| 5 | Cereal flour, 85% DM | 42 | 35.7 |
| | Mixture | 217.01 | 129.21 |
| | Water added | 41.41 | 129.21 |
| | Wet product mixture | 258.42 | 129.21 |
| | Dry mass content | (100) | 50% |

EXAMPLES 3 to 5

The procedure is as in Example 2 except that 110 kg of whole milk concentrate (Example 3)

110 kg of whey concentrate (Example 4) and 110 kg of a concentrate mixture of milk product (Example 5)

are used instead of 110 kg of skimmed milk concentrate. Pleasant-tasting, pulverulent or granular products are obtained in every case.

I claim:

1. A process for the production of a dry, stable bee product composition which comprises adding a bee product selected from the group consisting of bee pollen, bee bread, propolis, honey or mixtures thereof, said bee product containing 0–10% of dry mass of bee's wax, to a concentrate of a milk product having a dry mass content of 25–50%, adding a carbohydrate other than sugar to the mixture of the bee product and milk product, stirring the resulting mixture for 10–60 minutes at 15°–75° C. until a homogeneous dispersion is obtained, and drying the homogeneous dispersion, the amounts of the individual constituents being such that the total dry mass of the dry, stable, bee product composition contains from 10 to 40% by weight dry mass emanating from said bee product, 25–70% by weight dry mass emanating from said milk product, and from 3–55% by weight dry mass emanating from said carbohydrate.

2. The process of claim 1 wherein the mixture is stirred at 15°–45° C.

3. The process of claim 2 wherein said bee product contains 0–8% dry mass of bee's wax.

4. The process of claim 3 wherein said mixture is stirred at 25°–35° C., said bee product contains 0–5% bee's wax and said concentrate of a milk product has a dry mass content of 30–40%.

5. The process of claim 2 wherein a first additive selected from the group consisting of yeast, single cell protein, microorganism or mixture thereof is added to the mixture of bee product, milk product and carbohydrate in a quantity such that the dried, stable bee product composition contains up to 10% by weight dry mass emanating therefrom.

6. The process of claim 2 or 5 wherein a second additive selected from the group consisting of preservative, dye, flavoring, sweetener, minerals, trace elements, enzyme, vitamins, emulsifiers, amino acids, protein supplements or mixtures thereof are added to the mixture of bee product, milk product and carbohydrate in a quantity such that the dry, stable bee product composition contains up to 25% by weight dry mass emanating therefrom.

7. The process of claim 2 wherein said bee product comprises honey.

8. The process of claim 7 wherein the homogeneous dispersion is concentrated by evaporation and the resulting concentrate is dried.

9. The process of claim 8 wherein the dried concentrate is thereafter treated by size reduction and grinding.

10. A dry, stable bee product composition produced by the process of claim 1.

11. A dry, stable bee product composition produced by the proces of claim 2.

12. A dry, stable, bee product composition produced by the process of claim 6 containing from 10 to 40% by weight dry mass emanating from said bee product, from 25 to 75% by weight dry mass emanating from said milk product, from 3 to 55% by weight dry mass emanating from said carbohydrate, from 0 to 10% by weight dry mass emanating from said first additive and from 0 to 25% by weight dry mass emanating from said second additive, based on the total dry mass.

13. The dry, stable bee product of claim 12 wherein said bee product comprises honey.

* * * * *